June 5, 1956 O. J. KAY 2,749,409
OVERHEAT CONTROL DEVICE
Filed May 27, 1955 2 Sheets-Sheet 1
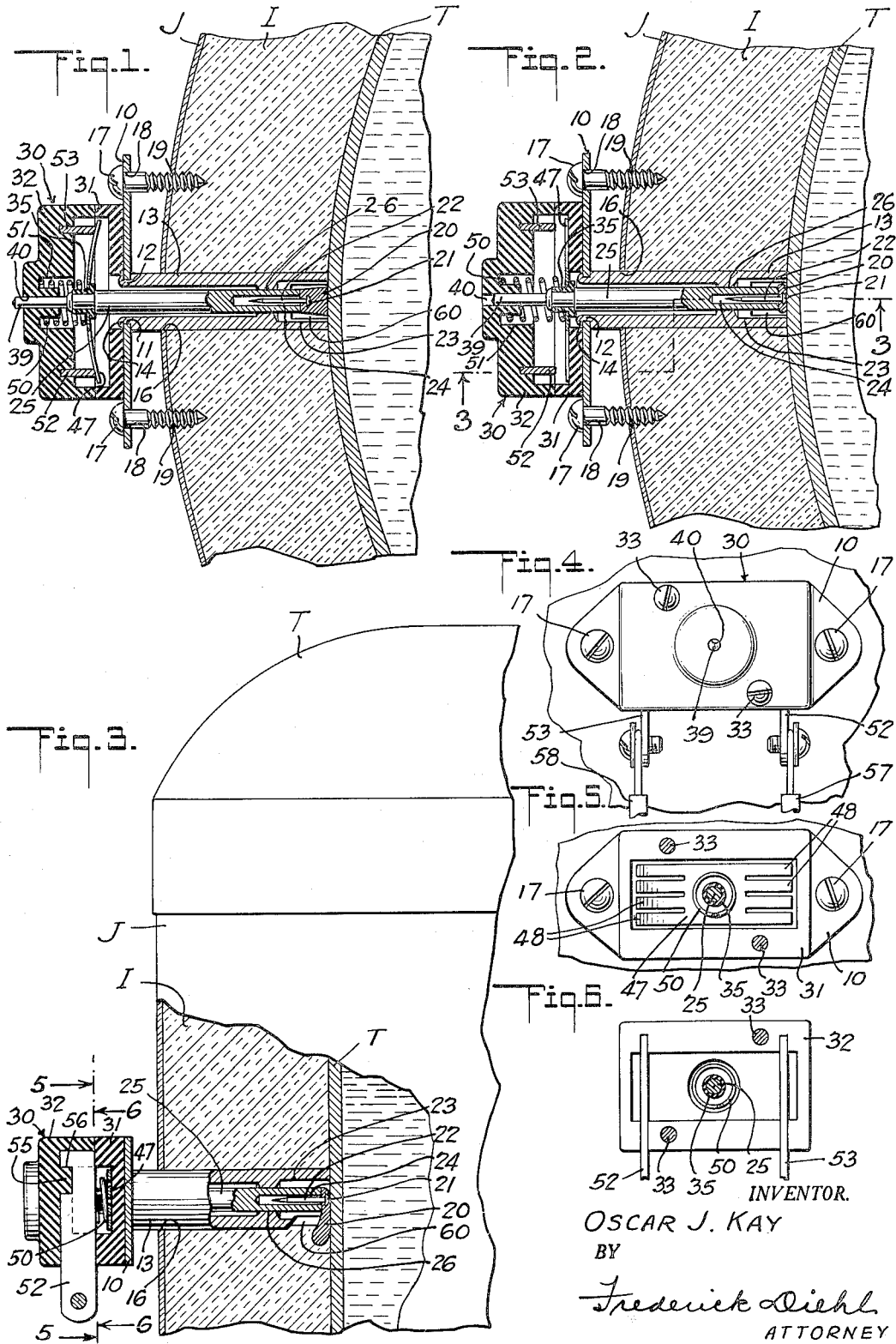
INVENTOR.
OSCAR J. KAY
BY
Frederick Diehl
ATTORNEY

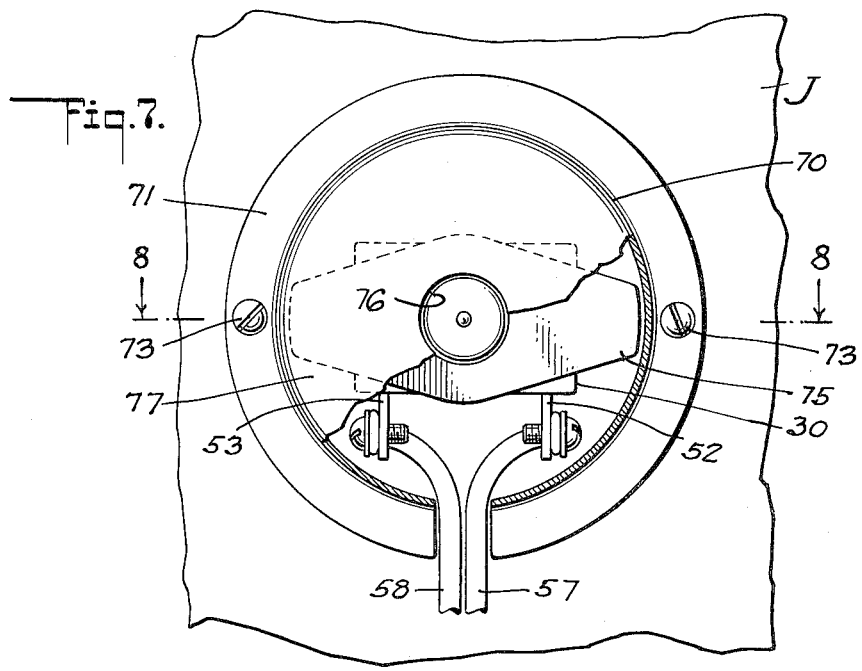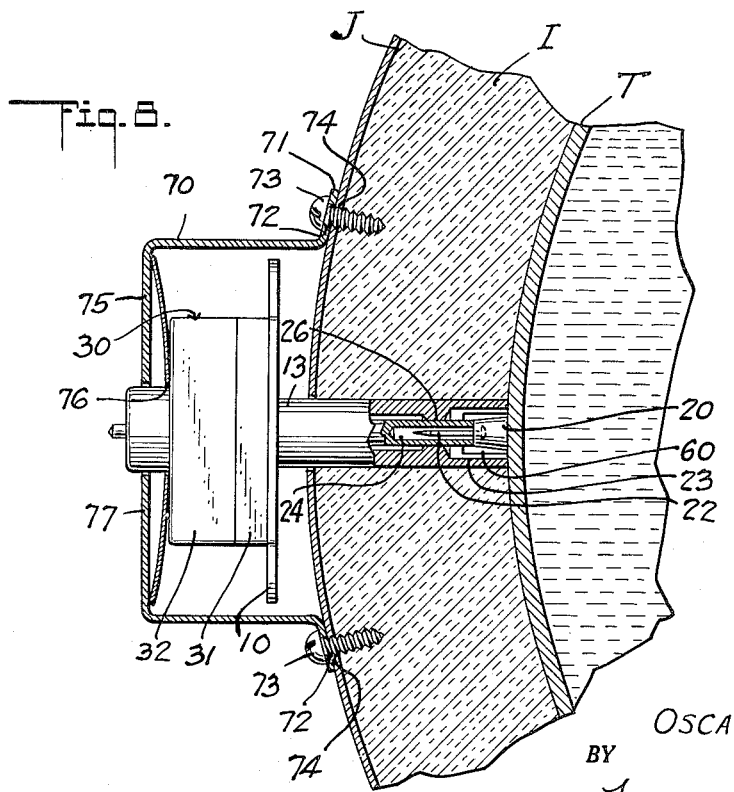

United States Patent Office 2,749,409
Patented June 5, 1956

2,749,409

OVERHEAT CONTROL DEVICE

Oscar J. Kay, Glendale, Calif.

Application May 27, 1955, Serial No. 511,629

9 Claims. (Cl. 200—142)

My invention relates generally to overheat controls for liquid heating apparatus, and more particularly to devices for preventing overheating of the water in a water heater or boiler should the usual thermostatic or other temperature responsive mechanism fail to operate when the water has been heated to a predetermined temperature for which such mechanism has been set.

An object of my invention is to provide an overheat control device which embodies a fusible element supported in direct physical contact with a wall of the tank of a water heater or boiler at a location to fuse and activate a suitable instrumentality such as will preferably discontinue the supply of fuel to the burner or heating element of the heater should the thermostat of the heater fail to do so when the water in the tank has been heated to the predetermined temperature for which the thermostat has been set, all so as to insure one hundred percent safety in operation of the heater by preventing a possible explosion of the tank or damage to the heater.

Another object of my invention is to provide an overheat control device which is structurally characterized by means enabling the device to be supported in operative relation to the liquid tank of a water heater or boiler with the utmost ease and dispatch, and which in the case of a tank enclosed in an insulating jacket, is securely mounted directly on the jacket with the fusible element of the device maintained in accurate operative engagement with the tank wall irrespective of variations in the thickness of the jacket, all so as to obviate the necessity for a specially constructed tank or special fastening methods, to the end that any stock water heater or any in service can be equipped with the device very simply and quickly.

With these and other objects in view, my invention resides in the combinations, arrangements and functional relationships of elements as set forth in the following specification and particularly pointed out in the appended claims.

In the accompanying drawings,

Figure 1 is a view showing in central longitudinal section, one form of overheat control device embodying my invention applied to a water heater, and illustrating the device in set position;

Figure 2 is a view similar to Figure 1 and illustrating the device in released position in response to fusing of the fusible element;

Figure 3 is a vertical sectional view taken on the line 3—3 of Figure 2;

Figure 4 is a view of the overheat control device in front elevation;

Figures 5 and 6 are detail sectional views taken on the lines 5—5 and 6—6, respectively, of Figure 3 and looking in the directions of the respective arrows;

Figure 7 is a view in front elevation partly in section, and showing a second form of overheat control device embodying my invention; and Figure 8 is a sectional view taken on the line 8—8 of Figure 7.

Referring specifically to the drawings and particularly to Figures 1 to 6, inclusive, this form of my invention is shown applied to a conventional domestic water heater of the type having a vertical, cylindrical tank T enclosed in a sheet metal jacket J, with the space between the tank and jacket filled with a suitable insulating material I such as rock or glass wool to minimize heat loss from water in the tank.

The device embodying my invention comprises a support in the form of a metal plate 10 of generally rectangular outline which is provided medially between its ends with an opening 11 receiving the reduced cylindrical portion 12 at one end of a stop or limit member in the form of an open ended tube which is designated at 13 and is rigidly secured to the plate to project from one side of the latter at right angles thereto by being swaged over the plate as indicated at 14.

In mounting the device on the water heater, the tube 13 projects through an opening 16 drilled in the jacket and through the thickness of insulation, with the inner end of the tube abutting the wall of the tank T to definitely locate the device relative to the tank irrespective of variations in the thickness of insulation which occurs in different models and makes of heaters.

The tube 13 is drawn into and maintained in firm engagement with the tank wall by means of sheet metal screw 17 passing freely through openings 18 in the end portions of the plate 10 and then screwed through openings 19 in the jacket, all so as to securely mount the device on the water heater without requiring any special tank construction or fastenings, thus enabling any water heater in stock or in service to be readily equipped with the device.

The tube 13 provides a receptacle for a fusible element 20 in the form of a generally cylindrical body of metal which is fusible at a predetermined temperature and is molded about the head 21 of a pin which is non-fusible at such temperature. The portion of the bore of the tube 13 at the inner end of the latter is enlarged as indicated at 23 to freely receive the element 20, and the pin 22 is removably fitted in a socket 24 in one end of a rod 25 to mount the element on the rod.

The rod 25 broadly constitutes a mounting means for the fusible element 20 and is slidably mounted in the tube 13 for movement co-axially thereof by means of a reduced portion 26 of the bore of the tube forming a suitable bearing for the rod. The other end of the rod 25 projects from the tube 13 into a switch housing 30 composed of two cup-shaped sections 31 and 32 of electrical insulating material secured together and to the plate 10 by screws 33 passing freely through the sections and threaded into the plate.

The rod 25 is reduced in diameter to receive a flanged collar 35 of electrical insulating material which is fitted tightly on the rod. The end portion of the rod is further reduced in diameter at 39 and is slidably mounted in a bore 40 in the section 32 of the switch housing 30 so as to freely mount the rod for reciprocating movement in the latter and in tube 13.

A flexible contact member 47 in the form of a rectangular plate slotted from opposite ends to form spring contact fingers 48, has a central opening tightly receiving the collar 35 to mount the member on the collar for movement bodily with the rod 25. A coil spring 50 seats at one end in a pocket 51 in the housing section 32, and at its other end bears against the contact member 47 to urge the rod 25 axially from the position shown in Figure 1 wherein the member 47 is flexed and bridges the switch terminals 52 and 53, to the position shown in Figure 2 wherein the member disengages the terminals, according as the fusible element 20 is intact or fused, as will be later fully described.

The terminals 52 and 53 are rigidly supported in the housing 30 by being confined between the sections 31 and 32 and locked by tongues 55 in the section 32 seating in notches 56 in the terminals as typically shown in Figure 3. The terminals project from the switch housing for connection to conductors 57 and 58 which may be part of an electrical circuit controlling a shut-off valve (not shown) for the main fuel burner or heating element of the water heater depending on whether the latter is of the gas or electric type.

As shown in Figures 1, 2 and 3, the wall of the tube 13 forming the bottom of the enlarged portion 23 of the tube bore is removed to provide a discharge opening 60 through which the fusible element 20 is free to flow when fused, in the operation of the invention which is as follows:

Under the action of the spring 50, the fusible element 20 is pressed into firm contact with the outer wall of the tank T while the flexible contact member 47 bridges the terminals 52 and 53 as shown in Figure 1, so as to complete the electrical circuit across the terminals.

Let it be assumed that the thermostat of the water heater which controls the main fuel valve thereof is set to extinguish the main burner by closing the valve when the temperature of the water in the tank T reaches 140 degrees F. With this setting, the metal of which the fusible element 20 is composed will as an example, be compounded to melt at 165 degrees F., or 25 degrees higher than the temperature for which the thermostat has been adjusted. The fusible element is subjected to the water temperature through the wall of the tank which causes but a negligible temperature differential at the outside of the wall against which the fusible element is being tightly pressed by the spring 50.

Should for any reason the thermostat fail to operate and the water temperature in the tank continue to rise above 140 degrees by the continued supply of fuel to the main burner until the fusing temperature of the fusible element 20 is reached, the latter will no longer form a filler piece or spacer between the wall of the tank and the adjacent end of the rod 25, and will flow through the discharge opening 60 in the tube 13 as the element melts. The spring 50 will now be free to move the rod 25 axially from the position of Figure 1 to that of Figures 2 and 3 so as to disengage the contact member 47 from the switch terminals 52 and 53. Disruption of the electric current at the terminals will perform the function of the thermostat by closing of the shut-off valve previously referred to, so as to insure absolute safety in the operation of the water heater by preventing an explosion or damage to the heater.

It will be noted from Figure 1 that in the set position of the device, the end portion of the rod 25 indicated by 39 projects from the switch housing, and that in the fused condition of the element 20 shown in Figure 2 the portion 39 is withdrawn into the bore 40, thus providing a telltale which immediately indicates to a service man that the failure of the water heater to operate is due to an overheated condition of the water as a result of a defective thermostat and not merely to the lack of a pilot light.

To replace a fused element 20, the screws 17 may be removed and the overheat control device then removed from the jacket J to render the fused element accessible and enable a new element to be applied to the rod 25. It will be noted that irrespective of variations in thickness of the insulating jacket, that the stop or limit member 13 establishes a definite relationship between the fusible element 20 and the contact member 47 under the action of the spring 50 so as to insure that the element will be urged by the spring into firm engagement with the tank wall while the contact member 47 is flexed in bridging engagement with the switch terminals 52 and 53, all so that when the element fuses, the spring 50 will be free to act to disengage the contact member 47 from the terminals.

Referring now to Figures 7 and 8, the second form of my invention herein shown is identical in construction to the form previously described with the following exceptions:

The sheet metal screws 17 are omitted from the plate 10, and a cup-shaped sheet metal cover 70 encloses the portion of the device otherwise exposed on the outside of the jacket J. The cover 70 is provided with a flange 71 through openings 72 in which sheet metal screws 73 pass freely and are threaded through openings 74 in the jacket to rigidly secure the cover to the jacket.

A flat spring 75 having a central opening 76 freely receiving the central portion of the section 32 of the switch housing 30, is interposed between the latter and the bottom 77 of the cover which constitutes an abutment co-acting with the loaded spring 75 and the switch housing 30 to urge the stop tube 13 into engagement with the wall of the tank T. In addition to enclosing the portion of the device which is exposed in the form of my invention previously described, the cover 70 provides a simple means which co-acts with the spring 75 to maintain the stop tube 13 in engagement with the tank irrespective of variations in the thickness of the insulating jacket of the tank, to thereby insure proper relationship of the fusible element 20 and the contact member 47 under the action of the spring 50 in the manner described in conjunction with the first form of my invention. To replace a fused element 20, the screws 73 may be removed and the overheat control device then removed from the jacket J to render the fused element accessible and enable a new element to be applied to the rod 25.

I claim:

1. An overheat control device for liquid heating apparatus having a tank in which liquid is heated comprising: an element composed of a material fusible at a predetermined temperature; means mounting said element for movement; means co-acting with said mounting means to urge same to move in a direction to maintain said element directly in physical pressing engagement solely with the exterior surface of a wall of the tank so as to leave teh wall structurally intact subject the element to heat conducted by the wall from liquid in the tank; means for activating an instrumentality; and means operatively connected to said mounting means to effect activation of said instrumentality when said mounting means is moved by said urging means upon fusing of said element.

2. An overheat control device for liquid heating apparatus having a tank in which liquid is heated comprising: a tubular stop member; a fusible element; means mounting said element in said stop member for movement; means for supporting said stop member with an end thereof abutting the exterior surface of a wall of the tank so as to leave the wall structurally intact; means co-acting with said mounting means to urge same to move in a direction to press said fusible element against the exterior surface of the tank wall so as to subject the element to the heat of liquid in the tank conducted by the wall; means for activating an instrumentality; and means operatively connected to said mounting means to effect activation of said instrumentality when said mounting means is moved by said urging means upon fusing of said element.

3. An overheat control device as embodied in claim 2 including a non-fusible pin about an end of which said fusible element is molded; said mounting means having a bore in which said pin is freely slidable so as to enable a fused element to be replaced with a new element upon withdrawal of the pin from the bore; said pin supporting said element clear of the stop member so as to prevent heat from being conducted away from the element.

4. An overheat control device for liquid heating apparatus having a tank and an insulating jacket therefor to minimize heat loss from liquid in the tank comprising: a tubular stop member; means supporting said stop member with the latter extending through an opening in said jacket and an end of the stop member abutting only the exterior surface of a wall of the tank so as to leave the wall structurally intact; a fusible element; means mounting said element in the stop member for movement; spring means co-acting with said mounting means to urge same to move in the stop member and press the fusible element against the exterior surface of the tank wall at said end of the stop member so as to subject the fusible element to the heat of liquid in the tank conducted through said wall; and means operatively connected to said mounting means to effect activation of an instrumentality when said mounting means is moved by said spring means upon fusing of said element.

5. An overheat control device as embodied in claim 4 wherein said instrumentality includes an electric switch having a contact member maintained in an operating position by said mounting means against the action of said spring means when said fusible element is intact and said device is installed as aforestated, and moved with said mounting means to a non-operating position when said element fuses or when said device is not installed.

6. An overheat control device for liquid heating apparatus having a tank and an insulating jacket therefor to minimize heat loss from liquid in the tank comprising: a support including a plate and a stop tube projecting from the plate; means mounting said support on the jacket of the apparatus with the stop tube extending through the jacket and an end of the tube abutting only the exterior surface of the wall of the tank so as to leave the wall of the tank intact; a rod slidably mounted in the stop tube; a fusible element on one end of the rod; a spring urging the rod axially in a direction to press the fusible element against the tank wall; and means operable in response to movement of the rod by the spring when said element fuses, to activate an instrumentality.

7. An overheat control device for liquid heating apparatus having a tank and an insulating jacket therefor to minimize heat loss from liquid in the tank comprising: a support including a plate and a stop tube projecting from the plate; screw threaded fastening members carried by said plate and threaded into said jacket to mount the support thereon with the stop tube extending through the jacket to abut only the exterior surface of the wall of the tank by tightening the said fastening members, whereby to leave the wall structurally intact; a fusible element; means mounting said element in said tube for movement; means urging said mounting means in a direction to press said fusible element against the tank wall; and means operable in response to movement of said mounting means by said urging means when said element fuses, to acivate an instrumentality.

8. An overheat control device of the class described comprising: a support including a tubular member; a fusible element; means mounting said element in said member for movement; means co-acting with said mounting means to urge same to a non-operating position wherein said element projects beyond one end of the said member; means adapted to mount said support on a liquid heating apparatus with an end of said member and said fusible element abutting only the exterior surface of the liquid tank of the apparatus so as to leave the tank structurally intact, and with said urging means loaded to dispose the fusible element in an operating position; and means operatively connected to said mounting means adapted to activate an instrumentality when said element fuses.

9. An overheat control device for liquid heating apparatus having a tank and an insulating jacket therefor to minimize heat loss from liquid in the tank comprising: a support including a stop member; a fusible element; means adapted to activate an instrumentality including a movable member; means co-acting with said support to mount said fusible element and movable member for unitary movement; means urging the fusible element and movable member to move; and means co-acting with said support to secure same to the insulating jacket of said apparatus with said stop member extending through the jacket into engagement solely with the exterior surface of the tank wall so as to leave the wall structurally intact and definitely locate said movable member in one predetermined position while the fusible element is pressed against the exterior surface of the tank wall under the action of said urging means so as to occupy an operating position irrespective of variations in the thickness of the insulating jacket, for movement of the movable member to another predetermined position by said urging means when said fusible element fuses.

References Cited in the file of this patent

UNITED STATES PATENTS

| 1,642,953 | Hickel et al. | Sept. 20, 1927 |
| 1,685,136 | Montgomery | Sept. 25, 1928 |
| 1,748,330 | Corey | Feb. 25, 1930 |
| 1,780,313 | Phelan | Nov. 4, 1930 |
| 1,982,984 | Durant | Dec. 4, 1934 |